Jan. 29, 1957 M. A. BELLUSCIO 2,779,204
GEAR TRANSMISSION FOR THE PURPOSE OF OBTAINING AN INFINITE
NUMBER OF REDUCTION RATIOS BETWEEN TWO FIXED LIMITS
Filed Sept. 23, 1953 4 Sheets-Sheet 2

INVENTOR
M. A. BELLUSCIO

ATTORNEYS

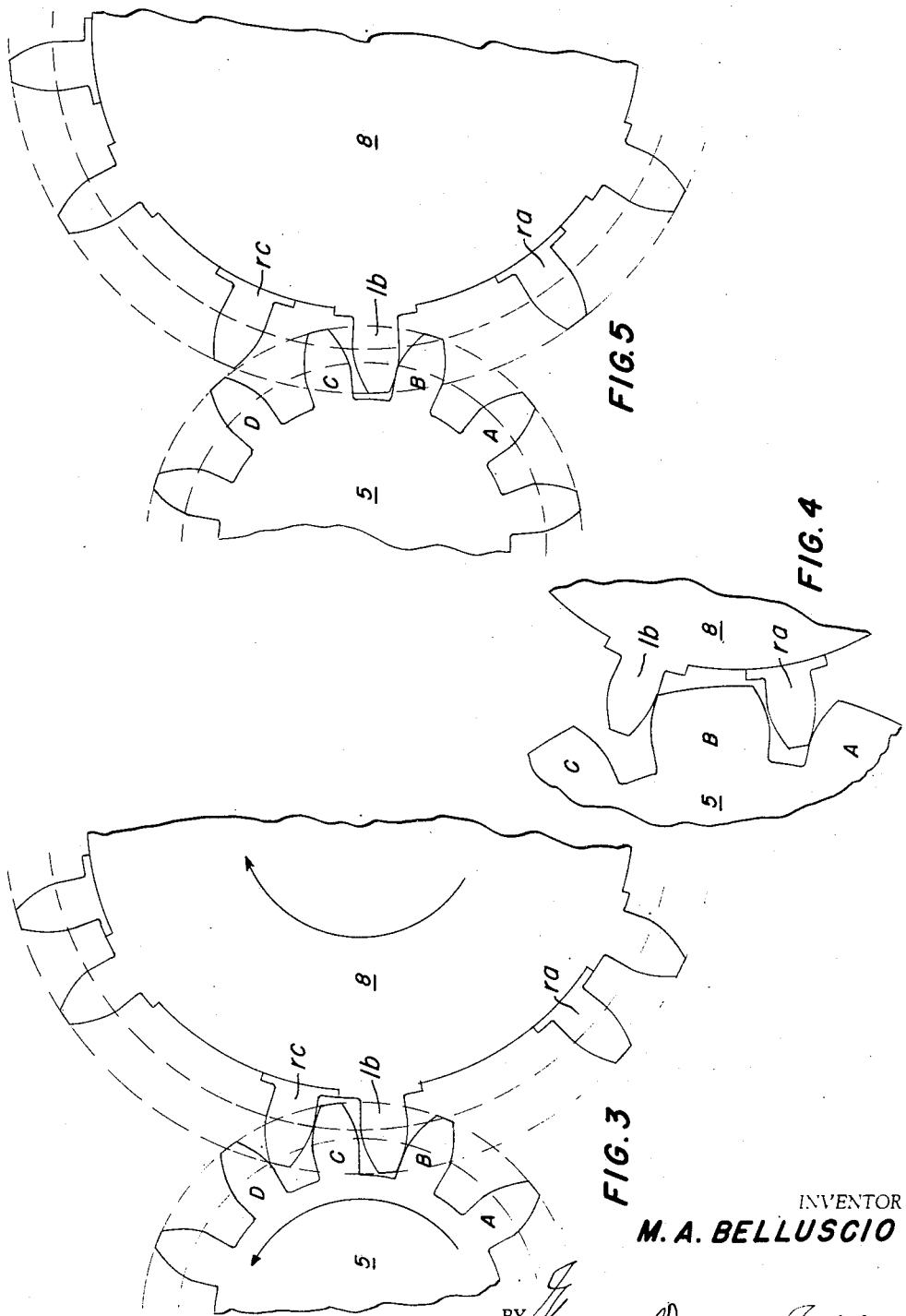

Jan. 29, 1957  M. A. BELLUSCIO  2,779,204
GEAR TRANSMISSION FOR THE PURPOSE OF OBTAINING AN INFINITE
NUMBER OF REDUCTION RATIOS BETWEEN TWO FIXED LIMITS
Filed Sept. 23, 1953  4 Sheets-Sheet 4
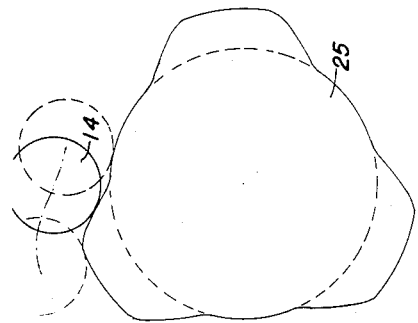
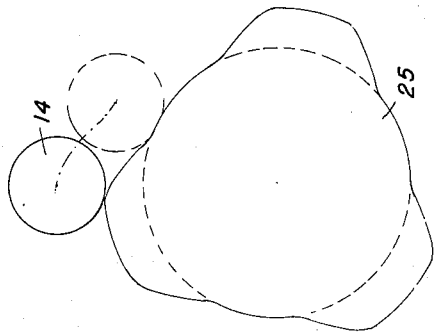
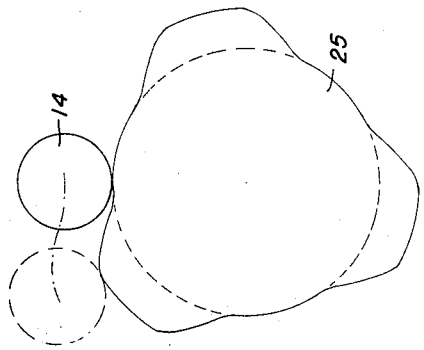
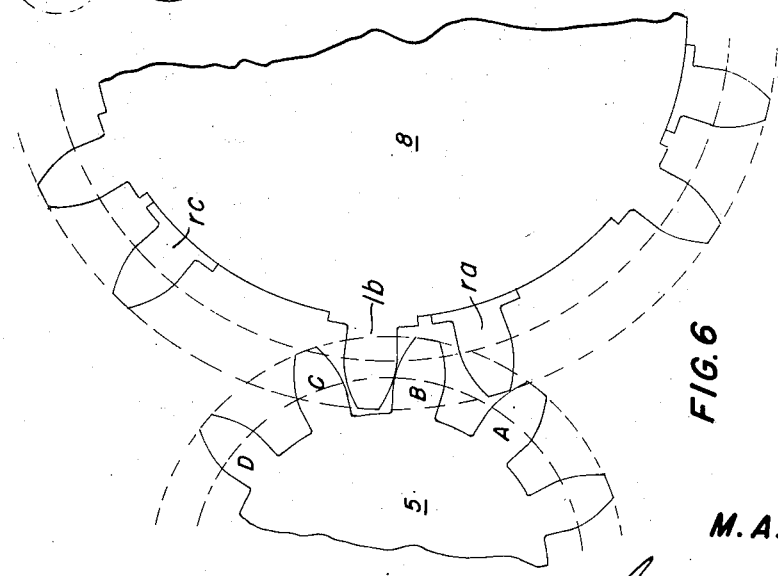
INVENTOR
M. A. BELLUSCIO
BY
ATTORNEYS

United States Patent Office 2,779,204
Patented Jan. 29, 1957

2,779,204

GEAR TRANSMISSION FOR THE PURPOSE OF OBTAINING AN INFINITE NUMBER OF REDUCTION RATIOS BETWEEN TWO FIXED LIMITS

Miguel Angel Belluscio, Buenos Aires, Argentina

Application September 23, 1953, Serial No. 381,835

8 Claims. (Cl. 74—325)

The present invention relates to a new type of gear transmission for the purpose of obtaining an infinite number of gear ratios between two fixed ratios.

One object of the invention is to obtain an unlimited range of gear ratios between two fixed limits (e. g., "high" and "low") by means of a pair of gears, thereby avoiding slip between driving and driven shafts.

A further object of the invention is to provide a pair of gears meshing together, one conical to present a diameter varying from one end to the other and the other a spur gear of fixed diameter whereby the gear ratio may be selected by moving the constant diameter spur gear to engage the portion of the conical gear at the diameter of the conical gear necessary to give the desired ratio.

Figure 1:
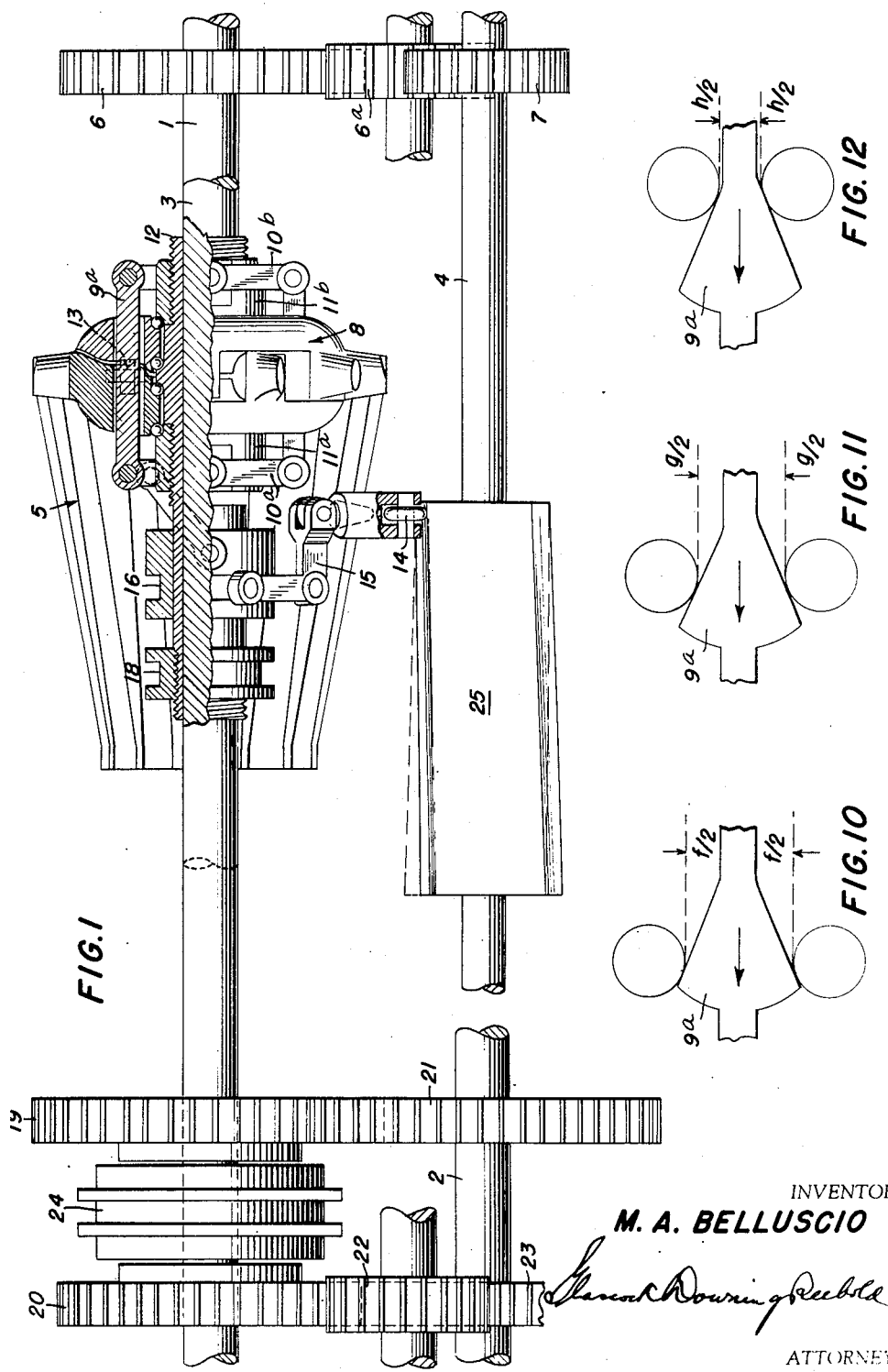
Figure 2:
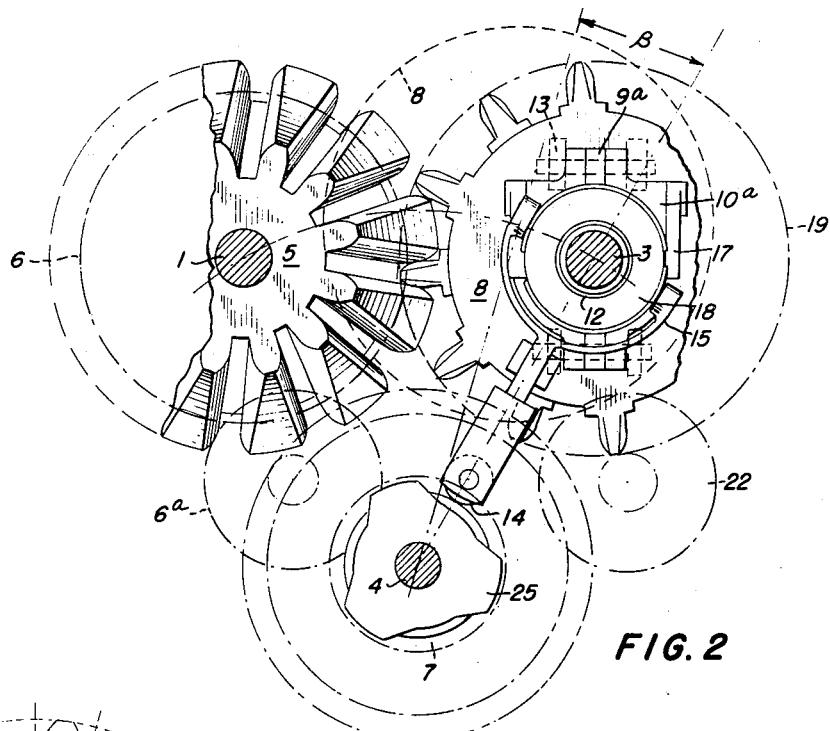
Figure 14:
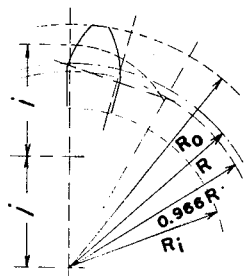
Figure 13:
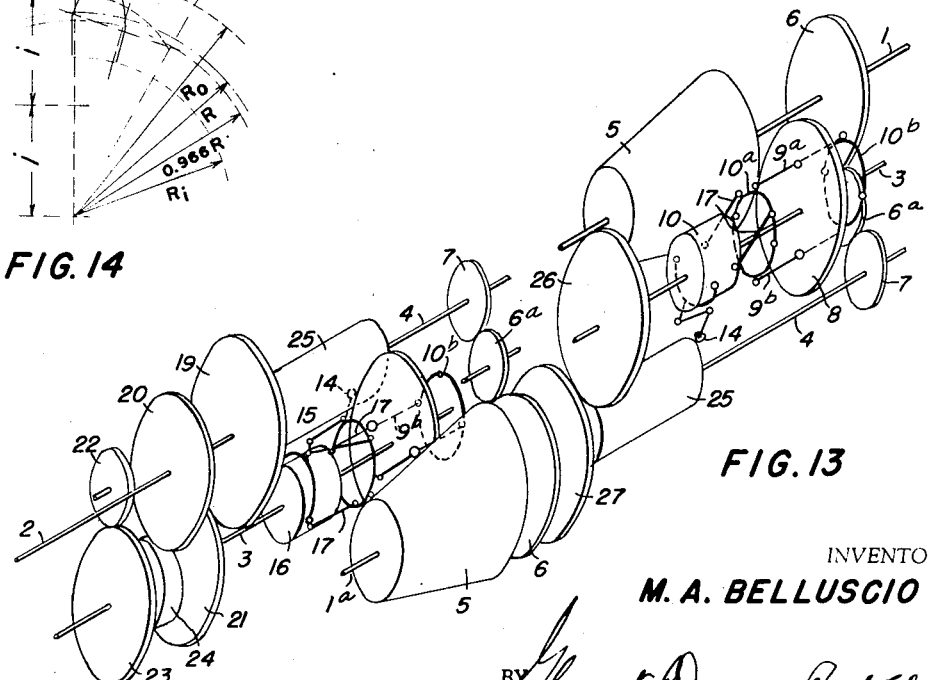

Other and further objects and advantages of the device will be clear from the following specification, taken with the accompanying drawings in which like characters of reference refer to like parts in the several views, and in which:

Fig. 1 is a side view of the transmission in working position, without showing bearings, enclosing box, or other details that are not fundamental, Fig. 2 is a left hand end view of the transmission, Fig. 3 shows the position of the gears 5 and 8 at the beginning of a meshing cycle at the smaller end of the conical gear, Fig. 4 shows gears 5 and 8 meshed at the widest end of the gear 5, Fig. 5 shows the position of the gears 5 and 8 after the gear 5 has turned approximately 5° from the position of Fig. 3, Fig. 6 shows the position of the gears 5 and 8 after the gear 5 has turned approximately 13.5° from the position of Fig. 3, Fig. 7 shows cam 25 in position corresponding to that of the gears 5 and 8 in Fig. 3, Fig. 8 shows cam 25 in position corresponding to that of the gears 5 and 8 in Fig. 5, Fig. 9 shows cam 25 in position corresponding to that of the gears 5 and 8 in Fig. 6, Fig. 10 shows wedge 9a in position corresponding to that of gears 5 and 8 in Fig. 3 and cam 25 in Fig. 7, Fig. 11 shows wedge 9a in position corresponding to that of gears 5 and 8 in Fig. 5 and cam 25 in Fig. 8, Fig. 12 shows wedge 9a in position corresponding to that of gears 5 and 8 in Fig. 6 and cam 25 in Fig. 9, Fig. 13 is a diagrammatic view of two units coupled one after the other, and Fig. 14 shows the method employed in the drawings to obtain approximately correct tooth sections by means of compass arcs.

The transmission (Figs. 1 and 2) consists of a clutch shaft 1, main shaft 2, countershaft 3 and auxiliary cam shaft 4, all suitably enclosed in a transmission box. Shaft 1 is driven by the engine through a clutch, and carries a special twelve tooth gear 5, which is shown as being conical. The word "conical" in describing gear 5 is intended to include tapering forms which are generally conical but the genetrix of which may be somewhat curved. The twelve teeth of gear 5 are machined unlike an ordinary bevel gear. The teeth cut all around the smallest perimeter extend toward the greatest perimeter with the inter-tooth measurement at the level of the pitch circle remaining constant. Therefore, towards the larger end of the gear 5 the teeth widen circumferentially, but the distance between them remains constant throughout the whole length of the gear and equal to that on the smallest end.

Shaft 1 also carries an ordinary gear 6 which drives gear 7 of cam shaft 4 through the idler gear 6a. These gears are always in mesh. The reason for the idler gear 6a is stated hereinafter.

Gear 5 of clutch shaft 1 drives another special composite gear 8 fixed on countershaft 3. This gear 8 is made up of two gears each of six teeth with a pitch equal to double the pitch of gear 5 at its greatest diameter. As the teeth of each component of gear 8 are intercalated between those of the other component, the result is a twelve tooth gear 8 of a diameter and pitch equal to that of the widest end of gear 5. The two component gears of 8 can move one with respect to the other and to countershaft 3 within two fixed limits. The said limits are such that two consecutive teeth of gear 8 (each one obviously belonging to a different component of 8) would have a pitch equal to that of the smallest end of gear 5 at one limit, and a pitch equal to twice that of the widest end of gear 5, minus the pitch at the smallest end of gear 5, at the other limit.

The movement of the component gears 8 with respect to each other is controlled by two wedges 9a and 9b placed axially through corresponding slots in component gears 8 and opposite to each other, as seen in Fig. 1 and Figs. 10, 11 and 12. These wedges are supported by levers 10a and 10b held on component gear retainer nuts 11a and 11b by means of pivots. The two wedges therefore have antagonical axial movements and act upon horizontal rollers 13 fixed to the component gears 8. When one wedge is pushed in, it tends to separate the two rollers and in consequence the two component gears 8 move with respect to each other. At the same time the opposite wedge is pulled out, allowing its corresponding rollers to approach each other. This axial movement of the wedges is produced by the cam shaft 4 acting upon roller 14 through right-angle fork lever 15 operating swivel follower 16, which in turn moves levers 17 fixed to levers 10a. Countershaft liner 12 can be moved axially over a length equivalent to that of gear 5, so that the whole extent of this gear may be covered by composite gear 8. This movement can be effected by means of follower 18 fixed to liner 12 and operated through a fork, not shown. Countershaft 3 is splined to allow for the axial movement of liner 12 but no independent rotating movement of the latter.

When liner 12 carrying gear 8 is moved axially it produces a movement of countershaft 3 away from or towards shaft 1, as it covers the outline of gear 5. It is therefore convenient to transform the movement of shaft 3 perpendicular to shaft 1 into a circular one around main shaft 2 and connect the two by means of ordinary gears so that the final drive may be taken from a non-oscillating shaft, in this instance, main shaft 2. This is accomplished by supporting shaft 3 exclusively from cam shaft 4 through linked bearings. As cam shaft 4 is in line with main shaft 2, the circular movement of countershaft 3 will be common to both.

The reason for this arrangement is that the cam shaft roller 14 must retain at all times its relative position with respect to countershaft 3, so as not to upset the cam setting.

On countershaft 3, beyond follower 18, are placed two gears 19 and 20. They are equipped with bearings so that they may rotate independently of countershaft 3 and are not allowed any axial movement. Gear 19 is in constant mesh with gear 21 on main shaft 2. Gear 20 is in constant mesh with pinion gear 22 and this one with gear 23 on main shaft 2. A meshing drum or dog clutch 24 which is axially movable but not movable with respect to countershaft 3 is mounted on this countershaft between gears 19 and 20. The inner teeth of this dog clutch 24 mesh with the small teeth of either gear 19 or 20 in its extreme axial positions. This follows usual practice in transmission gear meshing. At the center position no gear is meshed and gears 19 and 20 simply freewheel. Thus, center position is "neutral;" gear 19 position is "forward" drive; and gear 20 position is "reverse" drive. The relative sizes of these gears may be other than shown, if any fixed ratio is desired for "forward" or "reverse."

It is convenient that the movement of composite gear 8 be controlled by a guide, not shown, shaped according to the outline of gear 5 for the purpose of giving countershaft 3 its transverse movement when liner 12 is moved axially, thus relieving the teeth of gear 5 and composite gear 8 of having to produce this movement. The lift of cam 25 on cam shaft 4 varies from maximum at one end to minimum at the other end.

Cam shaft 4 would have to make six revolutions per revolution of clutch shaft 1 if cam 25 lifted only once per revolution. The small amount of lift required allows the cam 25 to be tripled, that is, to lift three times per revolution so as to make it possible to cut down the high rate of revolutions that would otherwise occur. In consequence, the ratio between gears 6 and 7 is of 1:2.

It is almost impossible to design a gear that can vary its pitch as necessary to mesh at different positions with a gear such as 5. In this case the problem has been approached by varying the pitch only at the zone of contact or mesh between the two gears. When composite gear 8 is meshed at the big end of gear 5 (Fig. 1 and Fig. 4) the pitch of gear 5 at that point is equal to the pitch of composite gear 8 in its normal position (teeth of the two components equidistant from each other). Roller 14 is at the end of cam 25 where there is no lift and therefore there is no relative movement between the two components of gear 8. Transmission is effected as if the two gears were of the orthodox type (Fig. 4). When gear 8 is moved toward the smaller end of gear 5, the pitch on this gear becomes increasingly smaller, the cam surfaces acting on roller 14 (Figs. 7, 8, 9) increases and consequently the movement of the wedges 9a and 9b and finally that of the two components of gear 8 with respect to each other and to countershaft 3 also increase. These movements reach their peak when gear 8 arrives at the smallest end of gear 5. The meshing process at this point is as follows: As seen in Figs. 3, 7 and 10, cam follower 14 is at a low point on cam 25. The right hand component tooth (Fig. 3) of gear 8 is fully in mesh with tooth C of gear 5. Tooth B of gear 5 has begun to mesh with tooth 1b (left hand component of gear 8). The pitch between teeth 1b and rc is equal to that of gear 5 at the point of mesh, but the pitch between ra and 1b, both on gear 8, is greater than that of the widest end of gear 5. Therefore, tooth ra must approach 1b until the pitch between the two is reduced to that of gear 5 at the point of mesh before tooth A of gear 5 crosses the outer circumference of composite gear 8. Before tooth ra can move, tooth rc which belongs to the same component, and will therefore move also, will be free to do so when tooth D of gear 5 has cleared the outer circumference of composite gear 8. In the position of gears shown in Fig. 3, tooth D of gear 5 is 2° ahead of the outer circumference of gear 8, but tooth rc may begin to move because tooth D will have cleared the mentioned circumference by the time tooth rc reaches the crossing point of the two outer circumferences. The load of tooth rc can be taken up by 1b.

In Figs. 5, 8 and 11, gear 5 has turned approximately 5°. As a result, cam shaft 4 has turned 10°. Roller 14 is on an up slope of cam 25 and its motion is causing tooth ra to approach 1b and tooth rc to move away from 1b. The full load is transmitted from B to 1b.

In Figs. 6, 9 and 12, the gear 5 has turned approximately 13.5°. Tooth A is just touching the outer circumference of gear 8 but tooth ra has almost finished approaching 1b and is within the space between teeth A and B. Tooth rc has moved to a pitch greater than that of the widest end of gear 5. When gear 5 has turned 30°, the relative position of the teeth is as in Fig. 3 with the following the position shown in Fig. 7. The left hand component tooth 1b is fully in mesh with tooth B of gear 5. Tooth A of gear 5 begins to mesh with tooth ra. The pitch between teeth ra and 1b is now equal to that of gear 5 at the point of mesh. As gear 5 continues to rotate, the cycle is repeated.

The process at intermediate positions of gear 8 and gear 5 is similar, the lower cam lift and shorter corresponding wedge movements accounting for the shorter distances to be covered by the moving components of gear 8.

The setting of cam 25 is very important and depends on the relative position of mesh between gears 6, 6a and 7. The proposed setting is an advance of 2°, as shown. Namely, the angle between the edge of the inner face of the outgoing tooth of gear (Fig. 3 tooth D) and the crossing point of the outer circumferences of gears 5 and 8, measured on gear 5, should be 2° in advance when cam 25 is at a maximum or minimum lift (Fig. 3) (angle $\gamma$). The proposed cam angle is 31° between maximum and minimum lifts. This means that gear 5 turns 15.5° and gear 8 when meshing with the smallest end of gear 5 turns 8.85° to complete one cycle.

When gear 8 moves lengthwise from one end to the other of gear 5, roller 14 covers an angle $\alpha$ of nearly 14° about the cam 25 as it swings about shaft 4. This does not upset the cam setting because at the same time gear 8 covers an angle equal to half the angle $\alpha$. As cam shaft 4 moves twice as fast as countershaft 3, the two angles are equivalent. Nevertheless, idler gear 6a is required to ensure that the angles are covered in the same direction.

The proposed end diameter ratio of 7:4 of gear 5 is considered to be the highest admissible that will allow a good mesh between gears 5 and 8 at the position shown (Fig. 4). The height and number of teeth have all been adopted, taking into account the necessity of good mesh and the limited space in which to produce the tooth movements of gear 8. None of these factors are considered to be final, however.

The mentioned ratio of 7:4 on gear 5, together with the gear 8 diameter of 7, will give two limit ratios of maximum 1:1 and minimum 1.75:1.

For automobiles, where a minimum gear ratio of at least 3:1 is required, it would be necessary to use two of the units as described, coupled one after the other as shown in Fig. 3. The meshing drum 24 with its group of gears would be placed at the outlet of the second unit and its place in the first unit taken by ordinary gears 26 and 27 connecting shafts 3 and 1a. Taking three equidistant intermediate positions of mesh on gear 5 and supposing both composite gears 8 to be moved at the same time, the obtainable ratios will be minimum (top) 1 to 1; ¼ distance 1.2544 to 1; ½ distance 1.6179 to 1; ¾ distance 2.1697 to 1; maximum (low) 3.0625 to 1.

The movement of composite gears 8 may be manually controlled or automatically through a centrifugal governor-accelerator pedal combination. It is obvious that the automobile will have a higher or lower acceleration according to whether gears 8 are moved quickly or slowly across gears 5. The rate of this movement may be such that at any given instant during acceleration the relative positions of gears 5 and 8 are those corresponding to the gear ratio that will allow the engine to work at maximum efficiency. On the other hand, this may also be obtained if a constant gear 8 movement is only available, by changing the conical shape of gear 5 to a modified cone having a profile according to the curve of maximum engine efficiency gear ratios in function of engine R. P. M. and car speed. The cam 25 would also have to be altered in its lengthwise outline, in the above case.

Notwithstanding the movements of the teeth of gear 8, it will be observed that tooth backlash between gears 5 and 8 is at all times normal and therefore the units will admit a reverse transmission of power such as when the car is going downhill with the engine in gear.

It will thus be seen that the objects hereinbefore set forth may readily and efficiently be attained and, since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention what is claimed as new and desired to be secured by Letters Patent is:

1. A variable speed transmission comprising a driving gear of truncated conical shape having teeth extending the length thereof, said teeth being of normal shape at the smaller end of the conical gear and wider than normal at the larger end of the conical gear so that the distance between the teeth is uniform throughout the length of the conical gear, a composite driven gear comprising two rotatably adjustable gear wheels providing alternate teeth of the composite gear, each of said gear wheels having teeth spaced to mesh between every second tooth at the larger end of said conical gear, means to selectively move said driven gear along said conical gear while holding said composite gear in mesh therewith, and cam operated means to adjust the spacing of the teeth of the composite gear to accommodate the width of the teeth on the conical gear at any point along its length.

2. The variable speed transmission of claim 1, in which said cam operated means comprises opposed wedges diametrically positioned in apertures in the composite gear whereby each of the gear wheels making up the composite gear are successively advanced more rapidly than the other such gear wheel so that the spacing between successive teeth of the composite gear wheel matches the tooth width on the driving gear.

3. A gear transmission device for obtaining reduction speeds infinitely variable between two end limits, comprising a driving gear of approximately truncated cone shape wherein the distance between teeth is constant along the entire gear, a composite driven gear axially adjustable on the shaft supporting it, said composite driven gear being made up of two gear wheels rotatably displaceable one in relation to the other, the teeth of one wheel alternating with those of the adjacent wheel, cam means to vary the distance between adjacent teeth of said composite driven gear whereby the driven gear will mesh with said conical driving gear at any of its axial adjusted positions.

4. A device according to claim 3, wherein the teeth of the driving gear widen in the direction of the end of larger diameter of said gear, the distance between teeth remaining uniform.

5. A device according to claim 3, wherein the gear wheels composing the composite driven gear are axially traversed by several opposing wedges lodged in diametrically opposite openings in said component parts, said wedges being connected to a lever mechanism operatively linked with said cam mounted on a cam shaft parallel to said driving gear.

6. A device according to claim 3, wherein the mechanism comprises a driving shaft carrying the driving gear of truncated cone shape, an auxiliary shaft carrying the driven gear, a cam shaft carrying the control cam, and a driven shaft on which the composite driven gear is mounted.

7. A device according to claim 3, including an auxiliary shaft, and a gear drum mounted thereon capable of shifting axially on said shaft, said drum being engageable on suitably disposed gears.

8. A device according to claim 3, wherein the shaft carrying the driven gear presents longitudinal grooves along which said driven gear is capable of shifting.

References Cited in the file of this patent
UNITED STATES PATENTS

| | | |
|---|---|---|
| 88,691 | Barton | Apr. 6, 1869 |
| 851,180 | Mathewson | Apr. 23, 1907 |
| 1,165,827 | Alquist | Dec. 28, 1915 |
| 1,539,149 | Thornburg | May 26, 1925 |
| 1,558,222 | Beetow | Oct. 20, 1925 |
| 2,066,758 | Bassoff | Jan. 5, 1937 |
| 2,654,262 | Stewart | Oct. 6, 1953 |